US012688972B2

(12) United States Patent
Kang

(10) Patent No.: US 12,688,972 B2
(45) Date of Patent: Jul. 21, 2026

(54) MULTILAYER ELECTRONIC COMPONENT CONTAINING GRAPHENE OXIDE

(71) Applicant: SAMSUNG ELECTRO-MECHANICS CO., LTD., Suwon-si (KR)

(72) Inventor: Dongwoo Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 83 days.

(21) Appl. No.: 18/406,839

(22) Filed: Jan. 8, 2024

(65) Prior Publication Data

US 2024/0282518 A1     Aug. 22, 2024

(30) Foreign Application Priority Data

Feb. 17, 2023     (KR) ........................ 10-2023-0021756

(51) Int. Cl.
| | |
|---|---|
| *H01G 4/232* | (2006.01) |
| *H01G 4/224* | (2006.01) |
| *H01G 4/30* | (2006.01) |

(52) U.S. Cl.
CPC ........... *H01G 4/2325* (2013.01); *H01G 4/224* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 2013/0045385 A1* | 2/2013 | Kim | ..................... | C23C 16/4417 427/79 |
| 2016/0079001 A1* | 3/2016 | Lin | ...................... | H01G 4/1245 361/305 |
| 2018/0144863 A1* | 5/2018 | Kim | ...................... | H01G 4/248 |
| 2021/0005385 A1 | 1/2021 | Lee et al. | | |
| 2021/0065984 A1* | 3/2021 | Oh | ......................... | H01G 2/065 |
| 2021/0193387 A1 | 6/2021 | Yun et al. | | |
| 2022/0122777 A1 | 4/2022 | Kang | | |
| 2022/0157526 A1 | 5/2022 | Yoo et al. | | |

FOREIGN PATENT DOCUMENTS

| | | | | |
|---|---|---|---|---|
| KR | 10-1891141 B1 | 8/2018 | | |
| KR | 20190031928 A | * 3/2019 | ............. | H01G 4/232 |
| KR | 10-2021-0078010 A | 6/2021 | | |
| KR | 10-2022-0052640 A | 4/2022 | | |

OTHER PUBLICATIONS

Translation KR101891141B1 no date.*
Translation KR 20190031982 (No date).*
Extended European Search Report dated Dec. 20, 2024, issued in corresponding European Patent Application No. 24152093.1.

* cited by examiner

*Primary Examiner* — Eric W Thomas
(74) *Attorney, Agent, or Firm* — Morgan Lewis & Bockius LLP

(57) ABSTRACT

A multilayer electronic component includes a body including a dielectric layer and internal electrodes, external electrodes disposed on the body, and a coating film disposed on at least a portion of an external surface of the body, wherein the coating film is disposed to contact at least a portion of the dielectric layer and includes a graphene oxide layer.

21 Claims, 7 Drawing Sheets

FIRST
DIRECTION

THIRD
DIRECTION

A

FIRST
DIRECTION

THIRD
DIRECTION

A'

MULTILAYER ELECTRONIC COMPONENT CONTAINING GRAPHENE OXIDE

CROSS-REFERENCE TO RELATED APPLICATION(S)

This application claims benefit of priority to Korean Patent Application No. 10-2023-0021756 filed on Feb. 17, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type capacitor mounted on the printed circuit boards of various types of electronic products such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof such as compactness, guaranteed high capacitance, and ease of mounting. As various electronic devices such as computers and mobile devices have been reduced in size and increased in power, demand for miniaturization and high capacitance of multilayer ceramic capacitors have been increased.

As the miniaturization and higher capacitance of multilayer electronic components has progressed, the importance of improving moisture resistance reliability has increased. In particular, as the number of stacks has increased to manufacture high-capacitance multilayer electronic components and the thickness of a cover portion or a side margin portion for protecting internal electrodes has decreased, external moisture penetration paths have become more diverse, and therefore, there is a need to improve moisture resistance reliability by minimizing moisture penetration paths.

SUMMARY

An aspect of the present disclosure is to provide a multilayer electronic component having improved moisture resistance reliability.

According to an aspect of the present disclosure, a multilayer electronic component includes: a body including a dielectric layer and internal electrodes; external electrodes disposed on the body; and a coating film disposed on at least a portion of an external surface of the body, wherein the coating film is disposed to contact at least a portion of the dielectric layer and includes a graphene oxide layer.

According to another aspect of the present disclosure, a method of manufacturing a multilayer electronic component includes: stacking ceramic green sheets on which internal electrode patterns are formed and performing cutting to form a stack body; sintering the stack body; spraying a solution including graphene oxide onto at least a portion of an external surface of the sintered stack body through a spray coating method to form a spray coating film including a graphene oxide layer; applying an external electrode paste to the sintered stack body; and heat-treating the external electrode paste.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
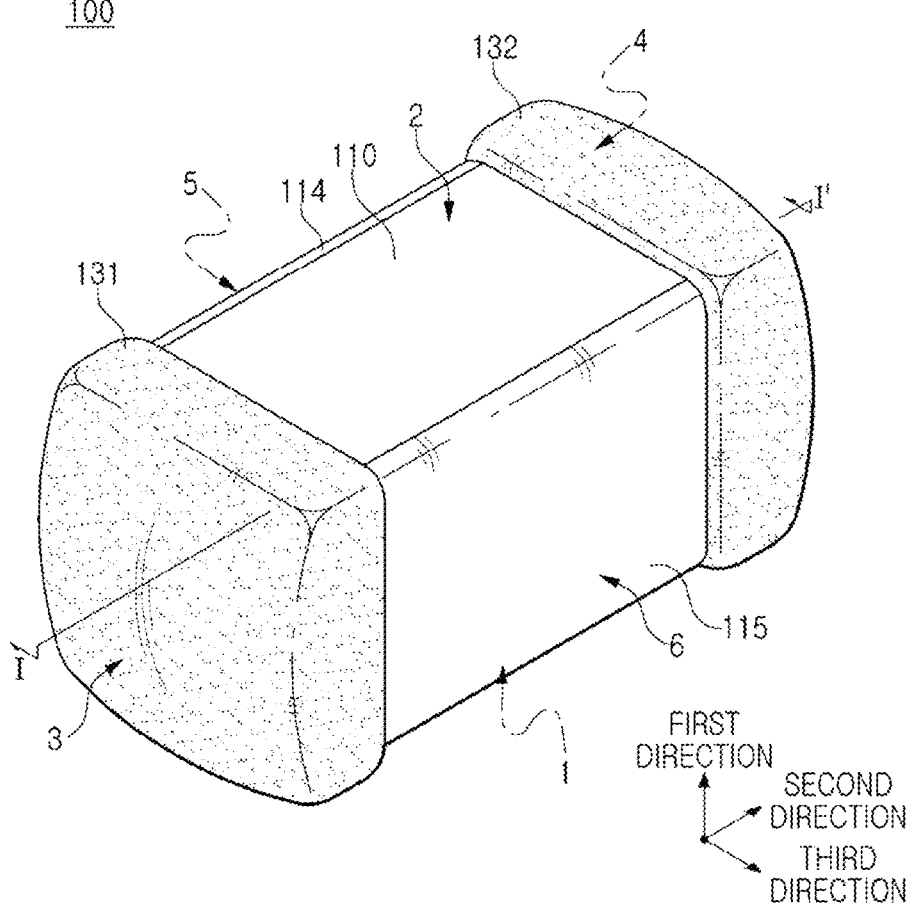
FIG. 1 is a perspective view schematically illustrating a multilayer electronic component according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations, such as "comprises" or "comprising", will be understood to imply the inclusion of stated elements but not the exclusion of any other elements.

In the drawing, a first direction may be defined as a stacking direction or thickness (T) direction, a second direction may be defined as a length (L) direction, and a third direction may be defined as a width (W) direction.

Multilayer Electronic Component

FIG. 1 is a perspective view schematically illustrating a multilayer electronic component according to an exemplary embodiment in the present disclosure.

Figure 2:
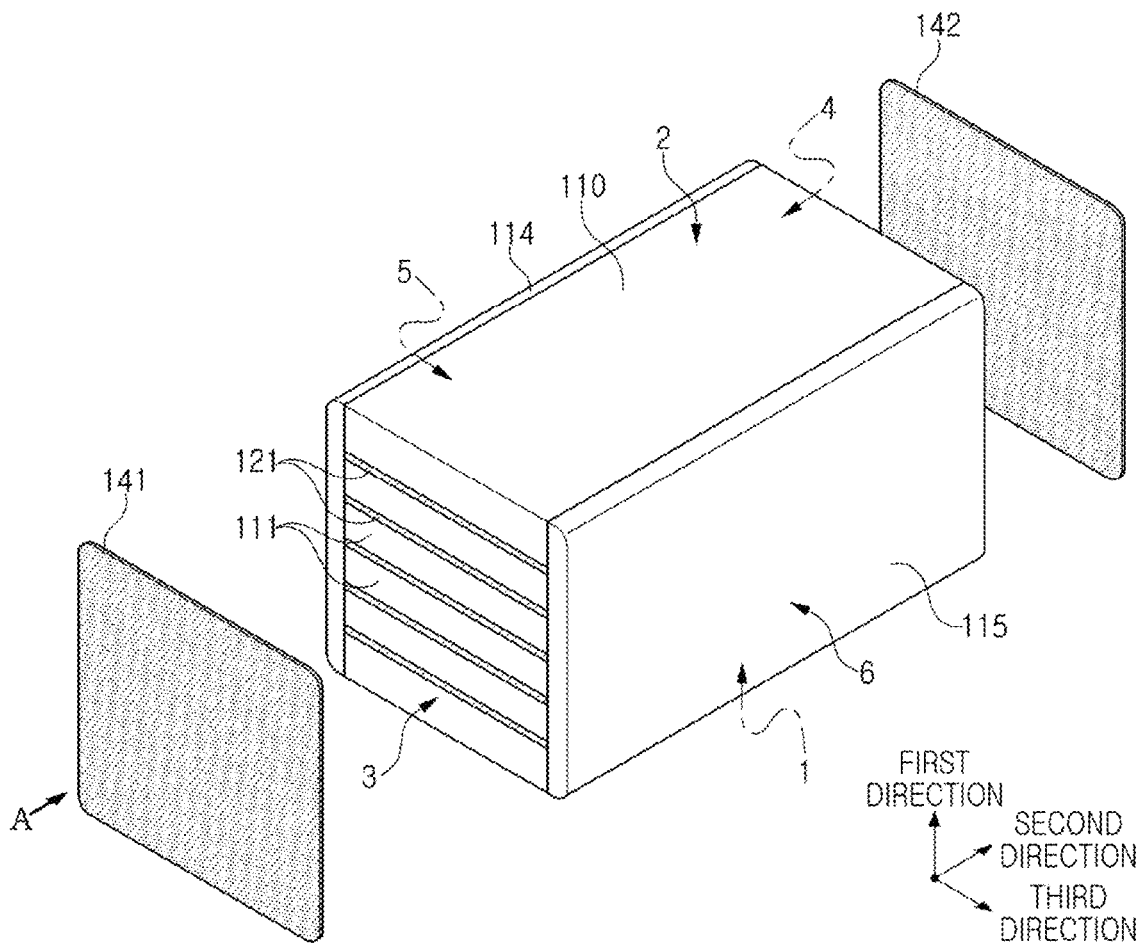
FIG. 2 is an exploded perspective view schematically illustrating the exterior of a body and a side margin portion and a coating film of FIG. 1.

FIG. 2 is an exploded perspective view schematically illustrating the exterior of a body and a side margin portion and a coating film of FIG. 1.

Figure 3:
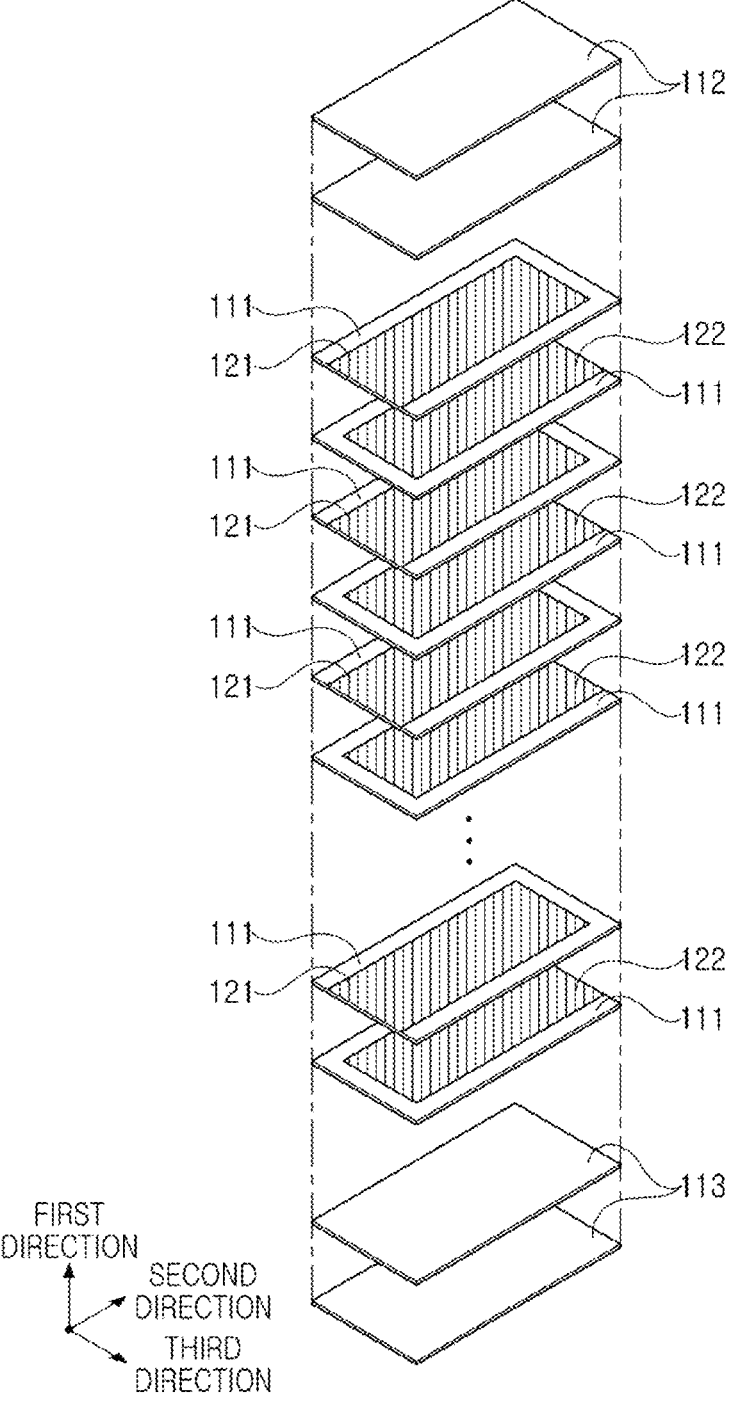
FIG. 3 is an exploded perspective view schematically illustrating a stack structure of an internal electrode of FIG. 1.

FIG. 3 is an exploded perspective view schematically illustrating a stack structure of an internal electrode of FIG. 1.

Figure 4:
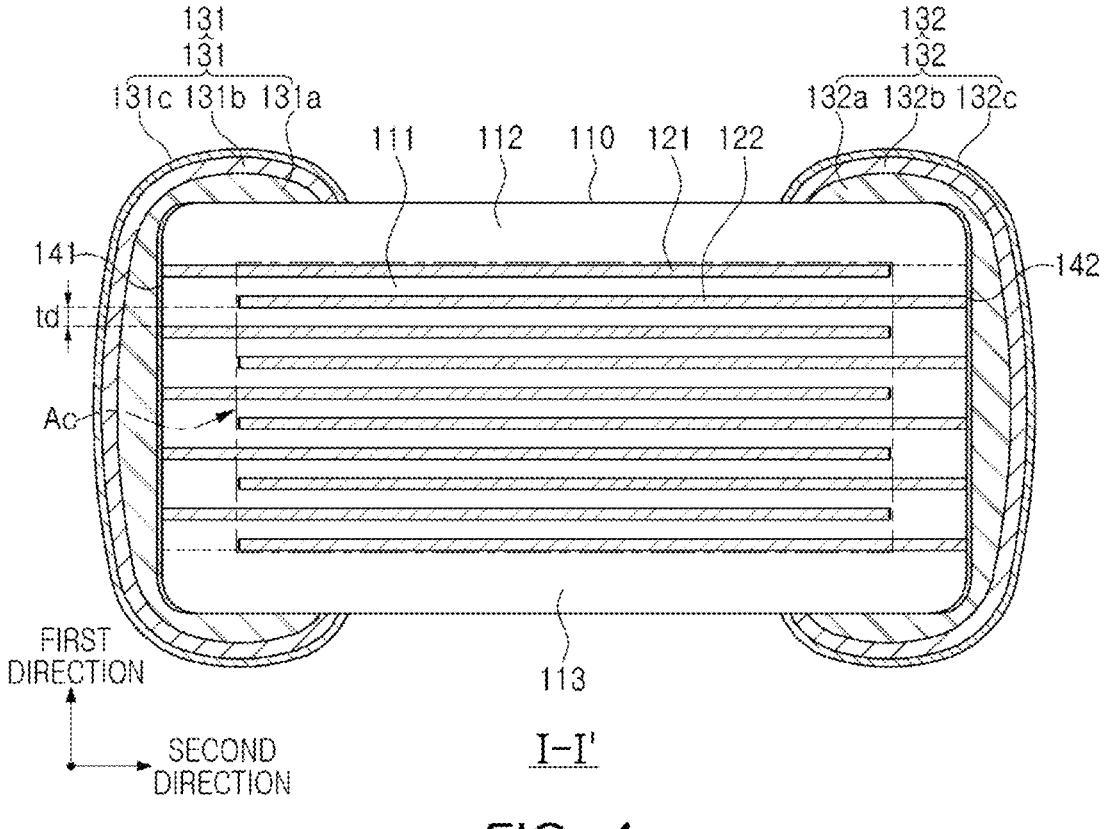
FIG. 4 is a schematic cross-sectional view taken along line I-I' in FIG. 1.

FIG. 4 is a schematic cross-sectional view taken along line I-I' of FIG. 1.

Figure 5:
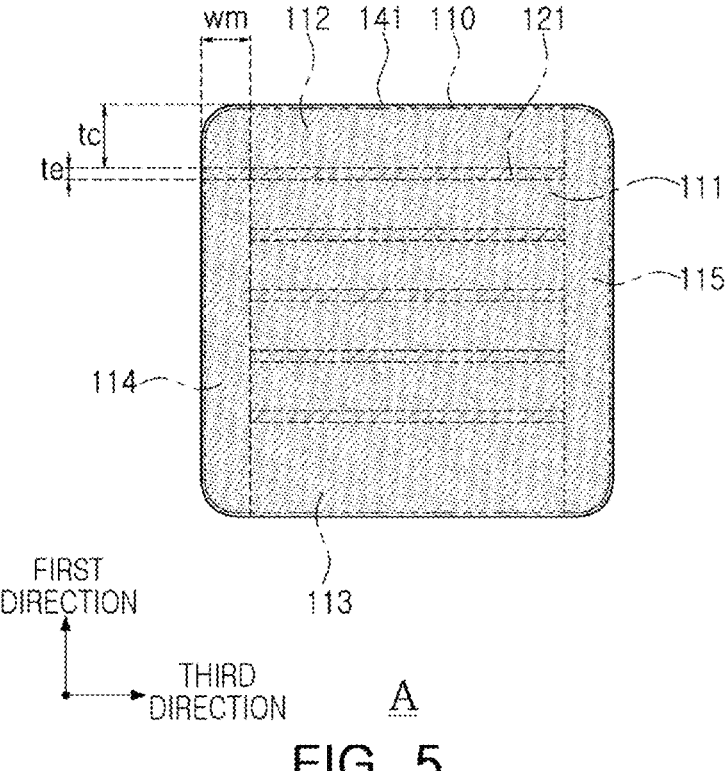
FIG. 5 is a view schematically illustrating an end-surface in direction A in FIG. 2.

FIG. 5 is a view schematically illustrating an end-surface in direction A of FIG. 1.

Figure 6:
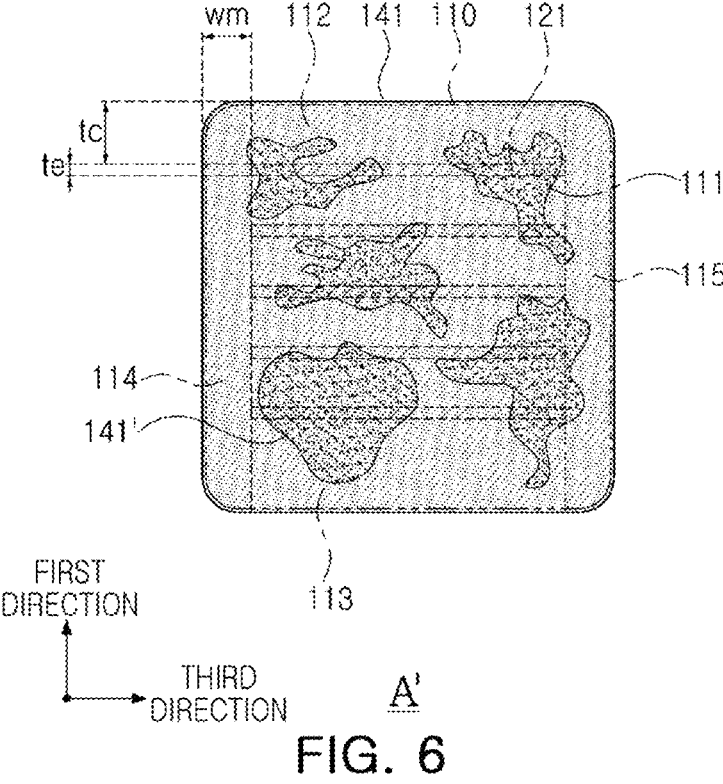
FIG. 6 is a view schematically illustrating a cross-section in direction A' of a multilayer electronic component according to another exemplary embodiment in the present disclosure.

FIG. 6 is a view schematically illustrating a cross-section in direction A' of a multilayer electronic component according to another exemplary embodiment in the present disclosure.

Hereinafter, a multilayer electronic component according to an exemplary embodiment in the present disclosure will be described in detail with reference to FIGS. 1 to 6. However, although a multilayer ceramic capacitor is described as an example of a multilayer electronic component, the present disclosure may also be applied to various electronic products using dielectric compositions, such as inductors, piezoelectric elements, varistors, or thermistors.

A multilayer electronic component 100 according to an exemplary embodiment in the present disclosure may include a body 110 including a dielectric layer 111 and internal electrodes 121 and 122; external electrodes 131 and 132 disposed on the body 110, and coating films 141 and 142 disposed on at least a portion of an external surface of the body 110, and the coating films 141 and 142 may be disposed to be in contact with at least a portion of the dielectric layer 111 and may include a graphene oxide layer.

In the body 110, the dielectric layers 111 and the internal electrodes 121 and 122 are alternately stacked.

More specifically, the body 110 may include the first internal electrodes 121 and second internal electrodes 122 disposed inside the body and alternately arranged to surface each other with the dielectric layer 111 therebetween to include a capacitance forming portion Ac forming capacitance.

Although a specific shape of the body 110 is not particularly limited, as shown, the body 110 may have a hexahedral shape or a shape similar thereto. Due to the shrinkage of ceramic powder particles included in the body 110 during a sintering process, the body 110 may not have a perfectly straight hexahedral shape but may have a substantially hexahedral shape.

The body 110 may have first and second surfaces 1 and 2 facing each other in the first direction, third and fourth surfaces connected to the first and second surfaces 1 and 2 and facing each other in the second direction, and fifth and sixth surfaces connected to the first to fourth surfaces 1, 2, 3, and 4 and facing each other in the third direction.

The plurality of dielectric layers 111 forming the body 110 are in a sintered state, and adjacent dielectric layers 111 may be integrated such that boundaries therebetween may not be readily apparent without using a scanning electron microscope (SEM).

A material for forming the dielectric layer 111 is not limited as long as sufficient electrostatic capacitance may be obtained. In general, perovskite (ABO$_3$)-based materials may be used, and for example, a barium titanate-based material, a lead composite perovskite-based material, or a strontium titanate-based material may be used. The barium titanate-based material may include a BaTiO$_3$-based ceramic powder particles, and the ceramic powder particles may include BaTiO$_3$ and (Ba$_{1-x}$Ca$_x$) TiO$_3$ (0<x<1), Ba(Ti$_{1-y}$Ca$_y$) O$_3$ (0<y<1), (Ba$_{1-x}$Ca$_x$) (Ti$_{1-y}$Zr$_y$)O$_3$ (0<x<1, 0<y<1) or Ba(Ti$_{1-y}$Zr$_y$) O$_3$ (0<y<1) in which Ca, Zr, and the like are partially dissolved in BaTiO$_3$.

In addition, as a material for forming the dielectric layer 111, various ceramic additives, organic solvents, binders, dispersants, etc. may be added to powder particles, such as barium titanate (BaTiO$_3$), according to purposes of the present disclosure.

A thickness td of the dielectric layer 111 may not be particularly limited.

However, in order to achieve high capacitance of multilayer electronic components, the thickness of the dielectric layer 111 may be 3.0 μm or less. In order to more easily achieve miniaturization and high capacitance of multilayer electronic components, the thickness of the dielectric layer 111 may be 1.0 μm or less, preferably, 0.6 μm or less, and more preferably, 0.4 μm or less.

Here, the thickness td of the dielectric layer 111 may refer to the thickness td of the dielectric layer 111 disposed between the first and second internal electrodes 121 and 122.

Meanwhile, the thickness td of the dielectric layer 111 may refer to the size of the dielectric layer 111 in the first direction. In addition, the thickness td of the dielectric layer 111 may refer to an average thickness td of the dielectric layer 111 and an average size of the dielectric layer 111 in the first direction.

The average size of the dielectric layer 111 in the first direction may be measured by scanning images of cross-sections of the body 110 in the first and second directions with a scanning electron microscope (SEM) at 10,000 magnification. More specifically, the average size of one dielectric layer 111 in the first direction may refer to an average value calculated by measuring the size of one dielectric layer 111 in the first direction at 30 equally spaced points in the second direction in the scanned image. The 30 equally spaced points may be designated in the capacitance forming portion Ac. In addition, if this average value measurement is expanded to ten dielectric layers 111 to measure the average value, the average size of the dielectric layers 111 in the first direction may be further generalized.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately arranged to surface each other with the dielectric layer 111 constituting the body 110 therebetween and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body 110 and connected to the first internal electrode 121, and a second external electrode 132 may be disposed on the fourth surface 4 of the body 110 and may be connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. Here, the first and second internal electrodes 121 and 122 may be electrically separated from each other by the dielectric layer 111 disposed therebetween.

Meanwhile, the body 110 may be formed by alternately stacking ceramic green sheets on which the first internal electrode 121 is printed and ceramic green sheets on which the second internal electrode 122 are printed, and then sintering the same.

A material forming the internal electrodes 121 and 122 is not particularly limited, and any material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. The printing method for the conductive paste for internal electrodes may be a screen-printing method or a gravure printing method, but the present disclosure is not limited thereto.

Meanwhile, a thickness te of the internal electrodes 121 and 122 may not be particularly limited.

However, in order to achieve high capacitance of the multilayer electronic component, a thickness of the internal electrodes 121 and 122 may be 1.0 μm or less. In order to more easily achieve miniaturization and high capacitance of multilayer electronic components, the thickness of the internal electrodes 121 and 122 may be 0.6 μm or less, and more preferably, 0.4 μm or less.

Here, the thickness te of the internal electrodes 121 and 122 may refer to a size of the internal electrodes 121 and 122 in the first direction. In addition, the thickness te of the internal electrodes 121 and 122 may refer to an average thickness te of the internal electrodes 121 and 122 and may refer to an average size of the internal electrodes 121 and 122 in the first direction.

The average size of the internal electrodes 121 and 122 in the first direction may be measured by scanning images of the cross-section of the body 110 in the first and second directions with a scanning electron microscope (SEM) at 10,000 magnification. More specifically, the average size of one internal electrode 121 in the first direction is an average value calculated by measuring the size of one internal electrode 121 in the first direction at 30 equally spaced points in the second direction in the scanned image. The 30 equally spaced points may be designated in the capacitance forming portion Ac. In addition, if the average value measurement is expanded to ten internal electrodes 121 and 122 to measure the average value, the average size of the internal electrodes 121 and 122 in the first direction may be further generalized.

Meanwhile, in an exemplary embodiment in the present disclosure, the average thickness td of at least one of the plurality of dielectric layers 111 and the average thickness te of at least one of the plurality of internal electrodes 121 and 122 may satisfy $2 \times te < td$.

In other words, the average thickness td of one dielectric layer 111 may be greater than twice the average thickness te of any one of the internal electrodes 121 and 122. Preferably, the average thickness td of the plurality of dielectric layers 111 may be greater than twice the average thickness te of the plurality of internal electrodes 121 and 122.

In general, for high-voltage electronic components, the reliability due to a decrease in breakdown voltage (BDV) in a high-voltage environment is a major issue.

Accordingly, in order to prevent a decrease in dielectric breakdown voltage under a high voltage environment, the average thickness td of the dielectric layer 111 is adjusted to be larger than twice the average thickness te of the internal electrodes 121 and 122, thereby increasing the thickness of the dielectric layer, which is the distance between the internal electrodes, and improving the breakdown voltage characteristics.

If the average thickness td of the dielectric layer 111 is less than twice the average thickness te of the internal electrodes 121 and 122, the average thickness of the dielectric layer, which is the distance between the internal electrodes, is thin, so the breakdown voltage may decrease and a short-circuit between the internal electrodes may occur.

In high-voltage electronic components, the average thickness te of the internal electrodes may be 1 μm or less and the average thickness td of the dielectric layer may be 3.0 μm or less, but are not necessarily limited thereto.

Meanwhile, the body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer 111 or two or more dielectric layers 111 on upper and lower surfaces of the capacitance forming portion Ac in the first direction, respectively, and may serve to prevent damage to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$)-based ceramic material.

Meanwhile, the thickness tc of the cover portions 112 and 113 may not be particularly limited.

However, in order to more easily achieve miniaturization and high capacitance of multilayer electronic components, the thickness tc of the cover portions 112 and 113 may be 100 μm or less, preferably, 30 μm or less, and more preferably, 20 μm or less, as ultra-small products.

Here, the thickness tc of the cover portions 112 and 113 may refer to the size of the cover portions 112 and 113 in the first direction. In addition, the thickness tc of the cover portions 112 and 113 may refer to an average thickness tc of the cover portions 112 and 113 and may refer to an average size of the cover portions 112 and 113 in the first direction.

The average size of the cover portions 112 and 113 in the first direction may be measured by scanning images of the cross-sections of the body 110 in the first and second directions with a scanning electron microscope (SEM) at 10,000 magnification. More specifically, the average size of the cover portions 112 and 113 may refer to an average value calculated by measuring the size in the first direction at points at equal intervals in the second direction in a scanned image of one cover portion 112.

In addition, the average size of the cover portion 112 in the first direction measured by the aforementioned method may be substantially equal to the average size of the cover portion 112 in the first direction in the cross-sections of the body 110 in the first and third directions.

Meanwhile, the multilayer electronic component 100 may include side margin portions 114 and 115 disposed on both end-surfaces of the body 110 in the third direction.

More specifically, the side margin portions 114 and 115 include a first side margin portion 114 disposed on the fifth surface 5 of the body 110 and a second side margin portion 115 disposed on the sixth surface 6 of the body 110.

As illustrated, the side margin portions 114 and 115 may refer to regions between both end surfaces in the third direction of the first and second internal electrodes 121 and 122 based on the cross-sections of the body 110 in the first and third directions and a boundary surface of the body 110.

The side margin portions 114 and 115 may be formed by applying conductive paste on a ceramic green sheet applied to the capacitance forming portion Ac, except for the regions in which the side margin portions 114 and 115 are to be formed, to form the internal electrodes 121 and 122, performing cutting so that the internal electrodes 121 and 122 after being stacked are exposed to the fifth and sixth surfaces 5 and 6 of the body 110 to suppress a step caused by the internal electrodes 121 and 122, and stacking a single dielectric layer 111 or two or more dielectric layers 111 on both end surfaces of the capacitance forming portion Ac in the third direction.

The side margin portions 114 and 115 may basically serve to prevent damage to the internal electrodes 121 and 122 due to physical or chemical stress.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate (BaTiO$_3$)-based ceramic material.

Meanwhile, a width wm of the first and second side margin portions 114 and 115 may not be particularly limited.

However, in order to more easily achieve miniaturization and high capacitance of the multilayer electronic component 100, the width wm of the side margin portions 114 and 115 may be 100 μm or less, preferably, 30 μm or less, and, more preferably, 20 μm or less, as an ultra-small product.

Here, the width wm of the side margin portions 114 and 115 may refer to a size of the side margin portions 114 and 115 in the third direction. In addition, the width wm of the side margin portions 114 and 115 may refer to an average width wm of the side margin portions 114 and 115 and may refer to an average size of the side margin portions 114 and 115 in the third direction.

The average size of the side margin portions 114 and 115 in the third direction may be measured by scanning images of the first and third direction cross-sections of the body 110 with a scanning electron microscope (SEM) at 10,000 magnification. More specifically, the average size may refer to an average value calculated by measuring the size in the third direction at 10 points at equal intervals in the first direction in a scanned image of one side margin portion 114.

Meanwhile, as the miniaturization and higher capacitance of multilayer electronic components progress, the importance of improving moisture resistance reliability has increased, and in particular, the number of layers has increased for the production of high capacitance multilayer electronic components. In addition, a cover portion or a side margin portion may be attached to protect the internal electrodes, but as the thickness thereof decreases, external moisture penetration path is becoming more diverse, so there is a need to minimize the external moisture penetration path to improve moisture resistance reliability.

Accordingly, the present disclosure may improve moisture resistance reliability by forming a graphene layer in a multilayer electronic component that may serve as a various penetration path for external moisture.

Graphene is a material that is chemically very stable, has excellent mechanical properties, and has excellent electrical conductivity. In addition, graphene is known to have impervious properties that block the passage of hydrogen molecules (H$_2$) and helium atoms (He) due to a fine lattice structure in graphene. In order to use graphene as an impermeable thin film, a technology is required to evenly coat a target substrate or device. In this case, when spray coating is used, graphene may be uniformly formed on various materials.

An exemplary embodiment in the present disclosure includes coating films 141 and 142 disposed on at least a portion of an external surface of the body 110, and the coating films 141 and 142 may be disposed in contact with at least a portion of the dielectric layer 111 and may include a graphene oxide layer.

Here, the graphene oxide layer may include a reduced graphene oxide layer.

More specifically, the coating films 141 and 142 may be disposed to contact at least a portion of the dielectric layer 111 and the internal electrodes 121 and 122 exposed to the outside of the body 110.

Graphene oxide (GO) refers to a state in which carbon particles included in graphene have been oxidized by acid, and reduced graphene oxide (rGO) refers to a state in which graphene oxide (GO) has been treated by heat under a reducing atmosphere to be reduced.

Meanwhile, in terms of an agglomeration phenomenon due to the characteristics of graphene or the characteristics of the spray coating method, there may be a region in which graphene is not detected even if a solution including graphene is sprayed, but this may be to a small degree that may not adversely affect the improved moisture resistance reliability.

As described above, the first internal electrode 121 may be exposed through the third surface 3 of the body 110 and may be connected to the first external electrode 131 disposed on the third surface 3 of the body 110. In addition, the second internal electrode 122 may be exposed through the fourth surface 4 of the body 110 and may be connected to the second external electrode 132 disposed on the fourth surface 4 of the body 110.

Here, the first coating film 141 is disposed to be in contact with the third surface 3 of the body 110, and the second coating film 142 is disposed in contact with the fourth surface 4 of the body 110, thereby protecting a joint surface between the body 110 and the external electrodes 131 and 132, which may be a penetration path for external moisture to improve moisture resistance reliability.

Even if the coating films 141 and 142 are disposed between the body 110 and the external electrodes 131 and 132, electrical connectivity between the internal electrodes 121 and 122 and the external electrodes 131 and 132 may not be deteriorated due to the internal electrodes 121 and 122 and the external electrodes 131 and 132 due to electrical conductivity of the coating films 141 and 142.

In the present disclosure, unless otherwise specified, the description of the coating films 141 and 142 includes both the first coating film 141 and the second coating film 142.

In addition, when the external electrodes 131 and 132 extend from the third and fourth surfaces 3 and 4 of the body 110 to be disposed on portions of the first, second, fifth, and sixth surfaces 1, 2, 5, and 6, the coating films 141 and 142 may also extend from the third and fourth surfaces 3 and 4 of the body 110 to be disposed on portions of the first, second, fifth and sixth surfaces 1, 2, 5, and 6.

That is, the coating films 141 and 142 may be disposed between the body 110 and the external electrodes 131 and 132 disposed on the body 110, and may block external moisture that may penetrate through an interface between the body 110 and the external electrodes 131 and 132.

In addition, when the side margin portions 114 and 115 are disposed on the fifth and sixth surfaces 5 and 6 of the body 110, a coating film may be disposed on the fifth and sixth surfaces 5 and 6 of the body 110 or a coating film may be disposed at an interface between the side margin portions 114 and 115 and the external electrodes 131 and 132.

In an exemplary embodiment in the present disclosure, coating films 141 and 142 including a graphene oxide layer may be disposed on both end-surfaces of the side margin portions 114 and 115 in the second direction.

Here, the graphene oxide layer may include a reduced graphene oxide layer.

In other words, the first coating film 141 may be disposed on the third surface 3 corresponding to one surface of the body 110 in the second direction and an extended surface of the third surface 3 corresponding to one surface of the first and second side margin portions 114 and 115 in the second direction. In addition, the second coating film 142 may be disposed on the fourth surface 4, which is the other surface of the body 110 in the second direction and an extended surface of the fourth surface 4 corresponding to the other surface of the first and second side margin portions 114 and 115 in the second direction.

An average thickness of the coating films 141 and 142 for improving moisture resistance reliability is not particularly limited.

Here, the thickness of the coating films 141 and 142 may refer to a thickness of the graphene oxide layer and may refer to a size of the coating film from an object on which the coating films 141 and 142 are to be formed. The average thickness may refer to a value obtained by measuring the sizes of the coating film from the object at a plurality of points and averaging the same.

For example, when coating films 141 and 142 are formed on the third and fourth surfaces 3 and 4 of the body, respectively, the size of the coating film 141 and 142 in the second direction may be defined as thickness, and the size of the coating films 141 and 142 in the second direction at three points measured at equal intervals of 100 nm in the first direction may be defined as an average thickness of each coating film 141 and 142.

Figure 8A:
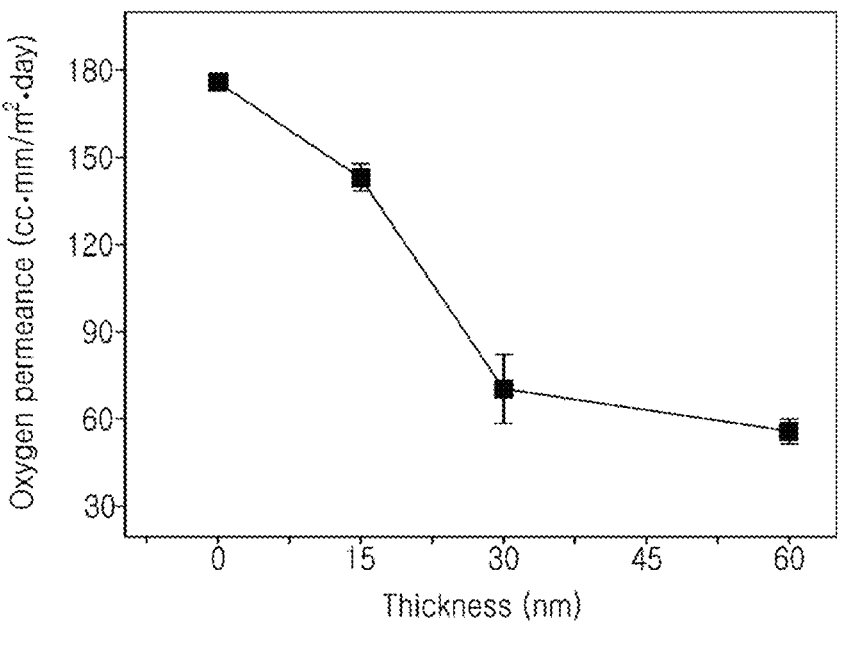
FIG. 8A is a graph schematically illustrating external moisture penetration according to a thickness of a coating film.

Referring to FIG. 8A, which is a view schematically illustrating external moisture permeability according to the thickness of the coating films 141 and 142, which is an exemplary embodiment in the present disclosure, it is confirmed that, when the coating films 141 and 142 are formed, external moisture penetration is reduced and that moisture resistance reliability tends to improve as the thickness increases.

However, in order to prevent delamination or lifting between the body 110 and the external electrodes 131 and 132 and aggregation and restacking of graphene oxide, the average thickness of the coating films 141 and 142 may be preferably nm or less.

A lower limit is not particularly limited, but moisture resistance reliability may be improved even if the coating films 141 and 142 are formed finely. For example, the lower limit may be 0.345 nm or more, which may refer to the thickness of one graphene layer. When the thickness of the coating films 141 and 142 is 15 nm or more, moisture resistance reliability may be further improved.

A method of measuring the thickness of the coating films 141 and 142 may be confirmed by, for example, the following method, but is not particularly limited thereto.

A sample may be acquired using a focused ion beam (FIB) to include the coating films 141 and 142 formed on the third and fourth surfaces 3 and 4 of the body 110 based on cross-sections of the multilayer electronic component 100 in the first and second directions, and the thickness of the coating films 141 and 142 may be measured by analyzing an image captured using a high resolution-transmission electron microscopy (HR-TEM).

When acquiring the sample for HR-TEM measurement, a pretreatment process may be important because the graphene layer of the coating films 141 and 142 may be damaged. Before acquiring the coating films 141 and 142 using FIB, when a barrier layer including a carbon layer-platinum layer-carbon layer is deposited in a region spaced apart from any one surface of the coating films 141 and 142, parallel to the first direction, at a certain distance in the second direction, damage to the graphene layer caused by FIB may be minimized, and thus, it may be easy to measure the thickness of the coating films 141 and 142.

As another method, a thickness ratio of the graphene layer may be measured using Raman spectroscopy or the thickness may be measured by performing surface analysis using scanning probe microscopy (i.e., atomic force microscopy (AFM)). Other methods and/or tools appreciated by one of ordinary skill in the art, even if not described in the present disclosure, may also be used.

Figure 8B:
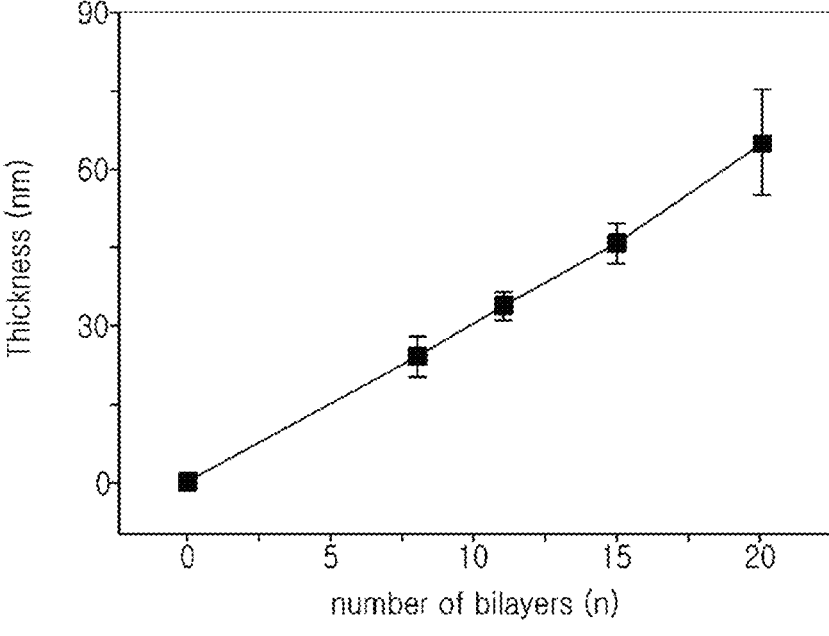
FIG. 8B is a graph schematically illustrating a thickness of a coating film according to the number of stacked graphene layers.

Referring to FIG. 8B, which is a view schematically illustrating the thickness of the coating film according to the number of stacked graphene layers, which is an exemplary embodiment in the present disclosure, the thickness of the coating films 141 and 142 may be controlled according to the number of layers of the graphene oxide layer. More specifically, the graphene oxide layer may be stacked using a spray method and may be formed to have an optimal thickness by adjusting, for example, the spray amount, the concentration of a sprayed graphene oxide solution, and the number of spray coatings.

In addition, the graphene oxide layer included in the coating films 141 and 142 may be 1 to 20 layers.

Here, the graphene oxide layer (GO) may include a reduced graphene oxide layer (rGO), and the reduced graphene oxide layer (rGO) may include a negatively charged reduced graphene oxide layer (rGO−) including COO− and a positively charged reduced graphene oxide layer (rGO+) including $NH_4^+$ depending on a functional group.

Both the negatively charged reduced graphene oxide layer (rGO−) and the positively charged reduced graphene oxide layer (rGO+) may refer to one reduced graphene oxide layer (rGO), and the reduced graphene oxide layer (rGO) may preferably include a structure in which the negatively charged reduced graphene oxide layer (rGO−) and the positively charged reduced graphene oxide layer (rGO+) are alternately stacked. More preferably, a bilayer may be formed including a reductive reduced graphene oxide layer (rGO−) and an oxidative reduced graphene oxide layer (rGO+), and the coating films 141 and 142 may include 1 or more and 10 or less double layers.

However, the present disclosure is not particularly limited thereto, and the coating films 141 and 142 may include one or more and 20 or less layers based on a graphene oxide layer, rather than a double layer.

The number of layers of the graphene layer may be identified by methods, such as Raman spectroscopy, Reflectance Anisotropy Spectroscopy (RAS), Angle-Resolved Photoemission Spectroscopy (ARPES), and Ellipsometry, but is not particularly limited thereto. If it is difficult to clearly determine the number of layers of the graphene oxide layer using the aforementioned method, a method of calculating the number of layers of the graphene oxide layer by performing inverse operation from the thickness of one graphene oxide layer and the thickness of the graphene oxide layer included in the coating film may also be used. Other methods and/or tools appreciated by one of ordinary skill in the art, even if not described in the present disclosure, may also be used.

Meanwhile, in an exemplary embodiment in the present disclosure, when the area in which the coating films 141 and 142 are disposed is defined as S and the area of the coating films 141 and 142 having a thickness of 0.345 nm to nm is defined as F, 30%≤F/S≤100% may be satisfied.

For example, when the coating films 141 and 142 are disposed on one surface of the body 110, that is, the area of the third surface 3 of the body 110 in which the first coating film 141 is disposed may be S and the area of a region of the first coating film 141 having a thickness of 1 nm to 30 nm may be F, and similarly, the area of the fourth surface 4 of the body 110 in which the second coating film 142 is disposed may be S and the area of a region of the second coating film 142 having a thickness of 1 nm to 30 nm may be F.

However, the present disclosure is not particularly limited thereto, and in the case of including the side margin portions 114 and 115, the area obtained by adding the area S1 of one surface disposed in the second direction of the body 110 and the area S2 of one surface disposed in the second direction of the side margin portions 114 and 115 may be calculated as S. Correspondingly, the same explanation may also be applied to the other surface in the second direction.

When a fraction (F/S) of the area F of the region in which the thickness of the coating films 141 and 142 is 0.345 nm to 30 nm to the area S in which the coating films 141 and 142 are disposed satisfies 30% to 100%, the moisture resistance reliability may be further improved.

If the fraction (F/S) of the area F of the region in which the thickness of the coating films 141 and 142 is 0.345 nm to 30 nm to the area S in which the coating films 141 and 142 are disposed is less than 30%, there is a risk that the target moisture resistance reliability may be deteriorated. The fraction (F/S) may be measured by processing HR-TEM or SEM images with an image processing software. Other methods and/or tools appreciated by one of ordinary skill in the art, even if not described in the present disclosure, may also be used.

Referring to FIG. 6, in a case in which the first coating film 141 is disposed on the third surface 3 of the body 110 and one surface of the first and second side margin portions 114 and 115 in the second direction, in other words, on one surface of the first and second side margin portions 114 and 115 in the second direction disposed on the same extended surface of the third surface 3 of the body 110, an area 141' of a region in which the thickness is 1 nm to 30 nm may be distributed.

Figures 7A, 7B, 7C:
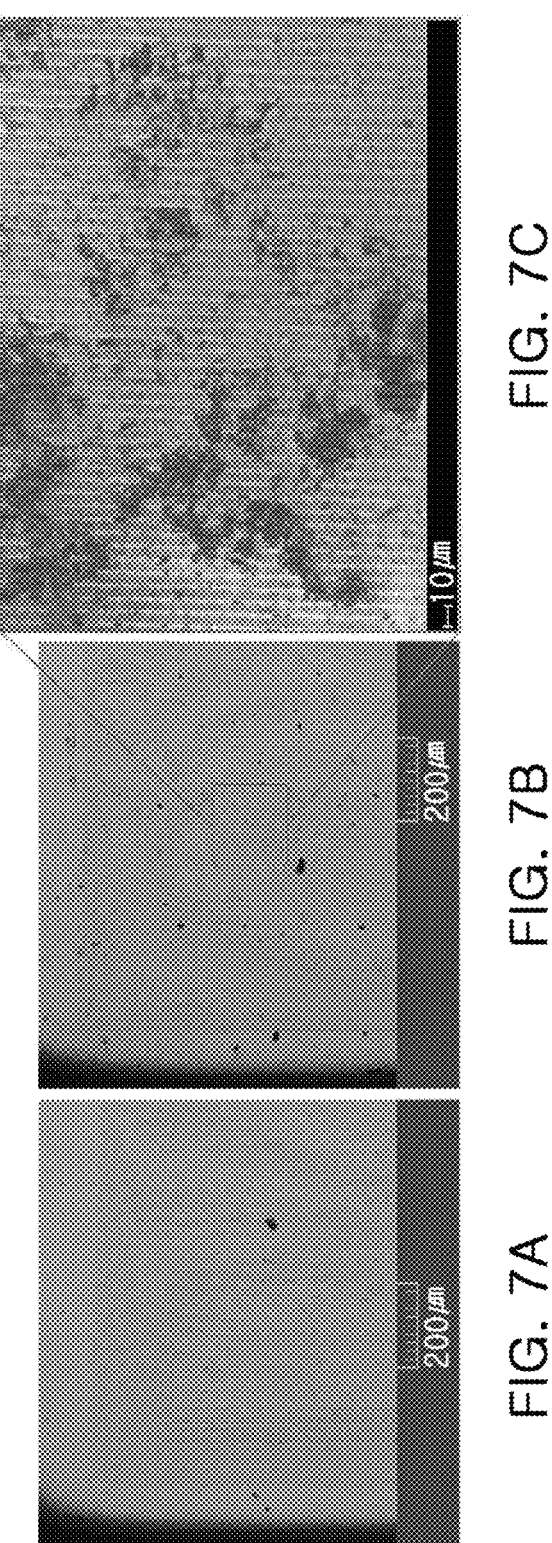
FIG. 7A is a SEM image of end-surface of a comparative example in which a coating film was not formed.
FIG. 7B is a SEM image of end-surface of an example in which a coating film was formed.
FIG. 7C is an enlarged SEM image of end-surface of a partial region in FIG. 7B.

More specifically, FIG. 7A is an SEM image of an end-surface of a comparative example without a coating film, FIG. 7B is an SEM image of an end-surface of an example with the coating film, and FIG. 7C is an SEM image enlarged from a partial region of FIG. 7B.

As illustrated in FIG. 7C, when the third surface 3 of the body 110, where the dielectric layer 111 and the first internal electrode 121 are exposed together, is observed through an SEM, a region observed to be dark and having an island shape with a stain corresponds to the first coating film 141 having a thickness of 1 nm or more, which is confirmed to be dispersed and disposed in the exposed dielectric layer 111 and the first internal electrode 121. However, the graphene oxide layer may be detected even in a region which is not island-shaped, and the first coating film 141 may be disposed therein.

In an exemplary embodiment in the present disclosure, a structure in which the ceramic electronic component 100 has two external electrodes 131 and 132 is described, but the number and shape of the external electrodes 131 and 132 may vary according to the shape of the internal electrodes 121 and 122 or other purposes.

The external electrodes 131 and 132 may be disposed on the body 110 and connected to the internal electrodes 121 and 122.

More specifically, the external electrodes 131 and 132 may include first and second external electrodes 131 and 132 disposed on the third and fourth surfaces 3 and 4 of the body 110 and connected to the first and second internal electrodes 121 and 122, respectively. That is, the first external electrode 131 may be disposed on the third surface 3 of the body and connected to the first internal electrode 121, and the second external electrode 132 may be disposed on the fourth surface 4 of the body and connected to the second internal electrode 122.

Meanwhile, the external electrodes 131 and 132 may be formed using any material as long as it has electrical conductivity, such as metal, and a specific material may be determined considering electrical characteristics, structural stability, etc. The external electrodes 131 and 132 may further have a multi-layer structure.

For example, the external electrodes 131 and 132 may include electrode layers 131a, 132a, 131b and 132b disposed on the body 110 and plating layers 131c and 132c disposed on the electrode layers 131a, 132a, 131b and 132b.

For more specific examples of the electrode layers 131a, 132a, 131b, and 132b, the electrode layers 131a, 132a, 131b, and 132b may be a first electrode layer including a first conductive metal and glass or a second electrode layer including a second conductive metal and resin.

Here, the first conductive metal may refer to a conductive metal included in the first electrode layers 131a and 132a, and the second conductive metal may refer to a conductive metal included in the second electrode layers 131b and 132b. Here, the first conductive metal and the second conductive metal may be the same or different and may include the same metal material, but are not particularly limited thereto.

In addition, the first electrode layers 131a and 132a may be fired electrodes, and the second electrode layers 131b and 132b may be conductive resin layers.

In addition, the electrode layers 131a, 132a, 131b, and 132b may be formed by sequentially forming a fired electrode and a resin-based electrode on the body.

In addition, the electrode layers 131a, 132a, 131b, and 132b may be formed by transferring a sheet including a conductive metal onto the body or by transferring a sheet including a conductive metal onto a fired electrode.

A material having excellent electrical conductivity may be used as the conductive metal included in the electrode layers 131a, 132a, 131b, and 132b. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof, but is not particularly limited thereto.

In an exemplary embodiment in the present disclosure, the electrode layers 131a, 132a, 131b, and 132b may have a two-layer structure including first electrode layers 131a and 132a and second electrode layers 131b and 132b, and accordingly, the external electrodes 131 and 132 may include first electrode layers 131a and 132a including a conductive metal and glass and second electrode layers 131b and 132b disposed on the first electrode layers 131a and 132a and including a conductive metal and a resin.

The first electrode layers 131a and 132a, including glass, serve to improve adhesion to the body 110, and the second electrode layers 131b and 132b, including a resin, serve to improve bending strength.

The conductive metal used in the first electrode layers 131a and 132a is not particularly limited as long as it is a material that may be electrically connected to the internal electrodes 121 and 122 to form capacitance, and may include, for example, one or more selected from the group consisting of nickel (Ni) and copper (Cu), palladium (Pd), silver (Ag), gold (Au), platinum (Pt), tin (Sn), tungsten (W), titanium (Ti), and alloys thereof. The first electrode layers 131a and 132a may be formed by applying a conductive paste prepared by adding glass frit to the conductive metal powder and then sintering the same.

The conductive metal included in the second electrode layers 131b and 132b may serve to electrically connect the first electrode layers 131a and 132a.

The conductive metal included in the second electrode layers 131b and 132b is not particularly limited as long as it is a material that may be electrically connected to the electrode layers 131a and 132a, and may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the second electrode layers 131b and 132b may include one or more of spherical particles and flake-shaped particles. That is, the conductive metal may include only flake-shaped particles, only spherical particles, or a mixture of flake-shaped particles and spherical particles. Here, the spherical particles may include a shape that is not completely spherical, for example, a shape in which a length ratio of the major axis and the minor axis (major axis/minor axis) is 1.45 or less. Flake-shaped particles refer to particles having a flat and elongated shape and a length ratio of the major axis and the minor axis (major axis/minor axis) thereof may be 1.95 or more but is not limited thereto. The lengths of the major and minor axes of the spherical particles and the flake-shaped particles may be measured from images obtained by scanning cross-sections in the first and second directions cut from the center of the ceramic electronic component in the third direction with a scanning electron microscope (SEM).

The resin included in the second electrode layers 131b and 132b may ensure bonding properties and serve as shock absorbers. The resin included in the second electrode layers 131b and 132b is not particularly limited as long as it may have bonding properties and shock absorption properties and may be mixed with conductive metal powder to make a paste, and may include, for example, an epoxy resin.

In addition, the second electrode layers 131b and 132b may include a plurality of metal particles, an intermetallic compound, and a resin. By including the intermetallic compound, electrical connectivity with the first electrode layers 131a and 132a may be further improved. The intermetallic compound may serve to improve electrical connectivity by connecting a plurality of metal particles, and may serve to surround and connect the plurality of metal particles to each other.

Here, the intermetallic compound may include a metal having a melting point lower than a curing temperature of a resin. That is, since the intermetallic compound includes a metal having a melting point lower than the curing temperature of the resin, the metal having a melting point lower than the curing temperature of the resin is melted during a drying and curing process and forms an intermetallic compound with some of the metal particles to surround the metal particles. Here, the intermetallic compound may preferably include a low melting point metal of 300° C. or lower.

For example, the intermetallic compound may include Sn having a melting point of 213 to 220° C. During the drying and curing process, Sn is melted, and the melted Sn wets high melting point metal particles, such as Ag, Ni or Cu, through a capillary action, and reacts with some of the Ag, Ni or Cu metal particles to form intermetallic compounds, such as $Ag_3Sn$, $Ni_3Sn_4$, $Cu_6Sn_5$, $Cu_3Sn$. Ag, Ni or Cu that did not participate in the reaction remain in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$, and $Cu_3Sn$.

The plating layers 131c and 132c may serve to improve mounting characteristics.

The type of the plating layer 131c and 132c is not particularly limited and may be a single plating layer 131c and 132c including one or more of nickel (Ni), tin (Sn), palladium (Pd), and alloys thereof or may be formed of multiple layers.

For a more specific example of the plating layers 131c and 132c, the plating layers 131c and 132c may be Ni plating layers or Sn plating layers, and the Ni plating layer and Sn plating layer may be sequentially formed on the electrode layers 131a, 132a, 131b, and 132b, or a Sn plating layer, a Ni plating layer, and a Sn plating layer may be formed sequentially. In addition, the plating layers 131c and 132c may include a plurality of Ni plating layers and/or a plurality of Sn plating layers.

Method of Manufacturing Multilayer Electronic Component

Hereinafter, a method of manufacturing a multilayer electronic component according to another exemplary embodiment in the present disclosure will be described in detail. However, contents that overlap the aforementioned multilayer electronic components will be omitted.

A method of manufacturing a multilayer electronic component according to another exemplary embodiment in the present disclosure may include stacking ceramic green sheets on which internal electrode patterns are formed and performing cutting to form a stack body; sintering the stack body; spraying a solution including graphene oxide onto at least a portion of an external surface of the sintered stack body through a spray coating method to form a spray coating film including a graphene oxide layer; applying an external electrode paste to the sintered stack body; and heat-treating the external electrode paste.

First, an operation of stacking ceramic green sheets on which an internal electrode pattern is formed and performing cutting so that the ceramic green sheet and the internal electrode pattern are exposed externally to form a stack body may be performed, and an operation of sintering the stack body may be performed.

This is the same as the conventional method or the same as the contents described above, so a description thereof will be omitted.

According to an exemplary embodiment in the present disclosure, an operation of spraying a solution including graphene oxide to at least a portion of the ceramic green sheet and the internal electrode pattern exposed to the outside of the cut stack body through a spray coating method to form a spray coating film including a graphene oxide layer may be included.

As described above, the ceramic green sheet and the internal electrode pattern may be exposed externally through any one surface, for example, the third and fourth surfaces of the cut stack body in the second direction, and the spray coating film including a graphene oxide layer may be formed by spraying a solution including graphene oxide to the third and fourth surfaces of the stack body through a spray coating method.

A one-layer graphene layer may be formed by spraying a solution including a positively charged graphene oxide layer ($GO^+$) including a functional group of $NH_4^+$ to a region to be sprayed through the spray coating method, for example. Next, a deionized water (DI) solution may be sprayed.

Thereafter, one-layer graphene layer may be stacked by spraying a solution including a negatively charged graphene oxide layer ($GO^-$) including a functional group of $coo^-$.

Next, the DI solution may be sprayed once again.

One cycle may be achieved using the four-step spray coating method, and a double-layer graphene, which is a two-layer graphene layer, may be formed.

Here, the DI solution may serve as a solvent to create a suspension by dispersing the positively charged graphene oxide layer ($GO^+$) and the negatively charged graphene oxide layer ($GO^-$). Accordingly, electrostatic attraction may act between a solution including the positively charged graphene layer ($GO^+$) and a solution including the negatively charged graphene layer ($GO^-$), facilitating formation of a coating film.

In an exemplary embodiment in the present disclosure, a concentration of graphene oxide of the solution including graphene oxide may be 0.01 mg/mL or more and 0.50 mg/mL or less.

When the concentration of graphene oxide satisfies 0.01 mg/mL or more and 0.50 mg/mL or less, a spray coating film including a uniform graphene layer may be formed.

If the concentration of graphene oxide exceeds 0.50 mg/mL, there may be a risk of agglomeration occurring due to electrostatic bonding between graphene.

An average thickness of the spray coating film may be 0.345 nm or more and 30 nm or less.

In addition, the graphene oxide layer included in the spray coating film may be 1 layer to 20 layers.

However, for electrostatic bonding between the positively charged graphene oxide layer ($GO^+$) and the negatively charged graphene oxide layer ($GO^-$), it may be desirable to include a double layer, and, in other words, a structure including one to ten double layers may be formed by performing one to ten cycles.

When side margin portion green sheets are formed on the fifth and sixth surfaces of the stack body, a spray coating film may be formed on both end surfaces of the stack body and the side margin portion green sheets in the second direction by applying a spray coating method, after attaching the side margin portion green sheets.

After forming the spray coating film, an operation of reducing the spray coating film may be included.

Here, the operation of reducing the spray coating film may be performed in a reducing atmosphere with a hydrogen concentration of 1.0% to 5.0% and a temperature of 230° C. to 250° C. for 23 hours to and 25 hours, thereby reducing the graphene oxide layer (GO) to a reduced graphene oxide layer (rGO).

Meanwhile, after forming the spray coating film, external electrode paste may be applied and heat-treated to form an external electrode. Here, it may be desirable to apply the external electrode paste on the spray coating film.

More specifically, an operation of applying a first electrode layer paste including a first conductive metal and glass to the spray coating film may be included, and an operation of applying a second electrode layer paste including a second conductive metal and a resin to the first electrode layer paste may be included.

Here, the operation of heat-treating the external electrode paste may be performed in a reducing atmosphere with a hydrogen concentration of 1.0% to 5.0% at a temperature of 230° C. to 250° C. for 23 hours to 25 hours.

More specifically, the sintering of the second electrode layer paste may be carried out in a reducing atmosphere with a hydrogen concentration of 1.0% to 5.0% at a temperature of 230° C. to 250° C. for 23 hours to 25 hours, and under the corresponding conditions, the graphene oxide layer (GO) included in the spray coating film may be reduced to a reduced graphene oxide layer (rGO).

Preferably, the second electrode layer paste corresponding to a conductive resin layer may be heat-treated at 240° C. for 24 hours, which is epoxy curing conditions, to reduce the graphene oxide layer (GO) to the reduced graphene oxide layer (rGO).

One of the various effects of the present disclosure is to improve the moisture resistance reliability of multilayer electronic components.

What is claimed is:

1. A multilayer electronic component comprising:
a body including:
    a dielectric layer, and
    internal electrodes alternately disposed with the dielectric layer in a first direction;
external electrodes disposed on the body, the external electrodes including:
    a first external electrode, and
    a second external electrode facing the first external electrode in a second direction; and
a coating film disposed on at least a portion of an external surface of the body,
wherein:
the external surface of the body includes:
    first and second surfaces facing each other in the first direction, and
    third and fourth surfaces facing each other in the second direction and connected to the first and second surfaces,
at least some of the internal electrodes extend from the third surface of the body,
the coating film includes a portion that is disposed on the third surface of the body,
the portion of the coating film disposed on the third surface of the body directly contacts at least a portion of the dielectric layer, and
the coating film includes a graphene oxide layer.

2. The multilayer electronic component of claim 1, wherein the coating film is disposed between the body and the external electrodes.

3. The multilayer electronic component of claim 2, wherein:

the body includes a capacitance forming portion including the dielectric layer and the internal electrodes, and a cover portion disposed on both end surfaces of the capacitance forming portion in the first direction, the external surface of the body further includes fifth and sixth surfaces facing each other in a third direction and connected to the first to fourth surfaces, the dielectric layer and the internal electrodes extend from the third and fourth surfaces of the body, the coating film is disposed to contact at least a portion of the third and fourth surfaces of the body, and the first external electrode and the second external electrode are disposed on the third and fourth surfaces of the body, respectively.

4. The multilayer electronic component of claim 3, further comprising:

a side margin portion disposed on fifth and sixth surfaces of the body, wherein the coating film is further disposed on at least a portion of both end surfaces of the side margin portion in the second direction.

5. The multilayer electronic component of claim 1, wherein an average thickness of the coating film is 0.345 nm or more and 30 nm or less.

6. The multilayer electronic component of claim 1, wherein the graphene oxide layer is 1 layer or more and 20 layers or less.

7. The multilayer electronic component of claim 1, wherein the graphene oxide layer includes a reduced graphene oxide layer.

8. The multilayer electronic component of claim 1, wherein $30\% \leq F/S \leq 100\%$, in which an area in which the coating film is disposed is defined as S and an area of the coating film having a thickness of 0.345 nm to 30 nm is defined as F.

9. The multilayer electronic component of claim 1, wherein the external electrodes include:

a first electrode layer disposed on the body and including a first conductive metal and glass; and a second electrode layer disposed on the first electrode layer and including a second conductive metal and a resin.

10. A method of manufacturing the multilayer electronic component of claim 1, the method comprising:

stacking ceramic green sheets on which internal electrode patterns are formed and performing cutting to form a stack body;

sintering the stack body;

spraying a solution including graphene oxide onto at least a portion of an external surface of the sintered stack body through a spray coating method to form a spray coating film including the graphene oxide layer;

applying an external electrode paste to the sintered stack body; and heat-treating the external electrode paste to form the external electrodes.

11. The method of claim 10, wherein the spray coating film is disposed between the sintered stack body and the external electrode paste.

12. The method of claim 11, wherein the stack body includes a capacitance forming portion including the ceramic green sheets and internal electrode patterns alternately disposed with one of the ceramic green sheets in the first direction and a cover green sheet disposed on both end surfaces of the capacitance forming portion in the first direction and includes first and second surfaces facing each other in the first direction, third and fourth surfaces facing each other in the second direction and connected to the first and second surfaces, and fifth and sixth surfaces facing each other in a third direction and connected to the first to fourth surfaces, the ceramic green sheets and the internal electrode patterns extend from the third and fourth surfaces of the stack body, the spray coating film is disposed to contact at least a portion of the third and fourth surfaces of the stack body, and the external electrode paste is applied to the third and fourth surfaces of the stack body.

13. The method of claim 12, further comprising:

forming a side margin portion green sheet on fifth and sixth surfaces of the stack body, after forming the stack body, wherein the spray coating film is further disposed on at least a portion of both end surfaces of the side margin portion green sheet in the second direction.

14. The method of claim 10, wherein an average thickness of the spray coating film is 0.345 nm or more and 30 nm or less.

15. The method of claim 10, wherein the graphene oxide layer is 1 layer or more and 20 layers or less.

16. The method of claim 10, wherein a concentration of the graphene oxide in the solution is 0.01 mg/mL or more and 0.50 mg/mL or less.

17. The method of claim 10, further comprising:

reducing the spray coating film, after forming the spray coating film, to form the coating film, wherein the reducing of the spray coating film is performed in a reducing atmosphere with a hydrogen concentration of 1.0% to 5.0% at a temperature of 230° C. to 250° C. for 23 hours to 25 hours.

18. The method of claim 10, wherein the applying of the external electrode paste includes:

applying a first electrode layer paste including a first conductive metal and glass to the sintered stack body; and applying a second electrode layer paste including a second conductive metal and a resin to the first electrode layer paste.

19. The method of claim 10, wherein the heat-treating of the external electrode paste is performed in a reducing atmosphere with a hydrogen concentration of 1.0% to 5.0% at a temperature of 230° C. to 250° C. for 23 hours to 25 hours.

20. A multilayer electronic component comprising:

a body including a dielectric layer and internal electrodes;

external electrodes disposed on the body; and a coating film disposed on at least a portion of an external surface of the body, wherein:

the coating film is disposed to contact at least a portion of the dielectric layer and includes a graphene oxide layer, and $30\% \leq F/S \leq 100\%$, in which an area in which the coating film is disposed is defined as S and an area of the coating film having a thickness of 0.345 nm to 30 nm is defined as F.

21. A multilayer electronic component comprising:

a body including:

a dielectric layer, and internal electrodes alternately disposed with the dielectric layer in a first direction;

external electrodes disposed on the body; and a coating film disposed on at least a portion of an external surface of the body, wherein:

the external surface of the body includes:

first and second surfaces facing each other in the first direction, and third and fourth surfaces facing each other in a second direction and connected to the first and second surfaces, at least some of the internal electrodes extend from the third surface of the body, the coating film includes a portion that is disposed on the third surface of the body, the portion of the coating film disposed on the third surface of the body directly contacts at least a portion of the dielectric layer, the coating film includes a graphene oxide layer, and an average thickness of the coating film is 0.345 nm or more and 30 nm or less.

* * * * *